(12) United States Patent
Durbin

(10) Patent No.: US 12,168,407 B2
(45) Date of Patent: Dec. 17, 2024

(54) FOLDING HANDLE RATCHET BINDER WITH TWO PIECE KNOB

(71) Applicant: Thomas Durbin, Broadview, IL (US)

(72) Inventor: Thomas Durbin, Broadview, IL (US)

(*) Notice: Subject to any disclaimer, the term of this patent is extended or adjusted under 35 U.S.C. 154(b) by 231 days.

(21) Appl. No.: 17/879,698

(22) Filed: Aug. 2, 2022

(65) Prior Publication Data
US 2024/0042918 A1 Feb. 8, 2024

(51) Int. Cl.
*B60P 7/00* (2006.01)
*B60P 7/08* (2006.01)
*F16G 11/12* (2006.01)

(52) U.S. Cl.
CPC .............. *B60P 7/083* (2013.01); *F16G 11/12* (2013.01)

(58) Field of Classification Search
CPC .................................. B60P 7/083; F16G 11/12
See application file for complete search history.

(56) References Cited

U.S. PATENT DOCUMENTS

| | | | |
|---|---|---|---|
| 3,338,359 A | 8/1967 | Baillie et al. | |
| 3,428,331 A | 2/1969 | Morgan et al. | |
| 4,500,073 A | 2/1985 | Smith | |
| 6,527,405 B2 | 3/2003 | Hsieh | |
| 6,945,516 B1 | 9/2005 | Scott et al. | |
| 8,166,831 B2 | 5/2012 | Ruan | |
| 8,851,255 B2 | 10/2014 | Mitchell | |
| 10,464,467 B2 | 11/2019 | Robins | |
| 11,333,220 B2 | 5/2022 | Redder | |
| 2008/0143057 A1 | 6/2008 | Knox et al. | |
| 2019/0351808 A1* | 11/2019 | Liu | F16G 11/12 |
| 2019/0351809 A1 | 11/2019 | Liu | |
| 2020/0164786 A1* | 5/2020 | Ruan | F16G 11/12 |
| 2021/0122287 A1* | 4/2021 | Mollick | F16G 3/006 |

FOREIGN PATENT DOCUMENTS

EP 1744842 B1 1/2007

* cited by examiner

*Primary Examiner* — Emmanuel M Marcelo
(74) *Attorney, Agent, or Firm* — McConnell Law Firm PC; Robert McConnell

(57) ABSTRACT

An improved ratchet binder with a folding handle with two connecting ends and includes an enclosed ratchet gear. The direction of rotation of the enclosed ratchet gear is determined by a knob located on the ratchet gear. The knob includes a handle for improved leverage on the knob. The knob may be lifted and rotated 180 degrees to change the direction of rotation from binding a load (decreasing the distance between the connecting ends) or releasing a load (increasing the distance between the connecting ends). A raised knob also allows free motion of the gear for quick release.

The knob is connected to a two-sided pawl that engages with the gear. The pawl includes a pawl spring to provide tension on the knob and to ensure engagement of the pawl with the ratchet gear.

10 Claims, 23 Drawing Sheets

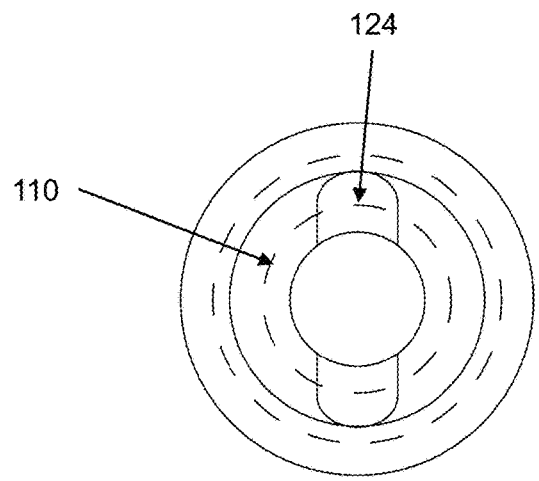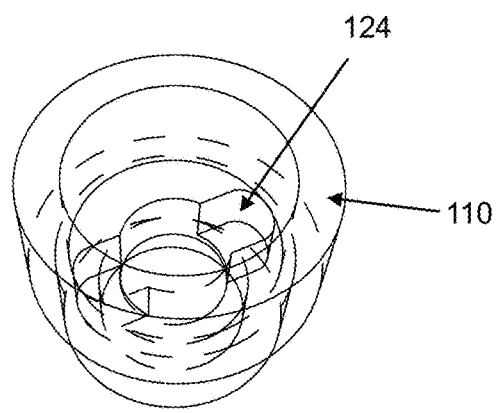
Fig. 6a　　　　　　　Fig. 6b
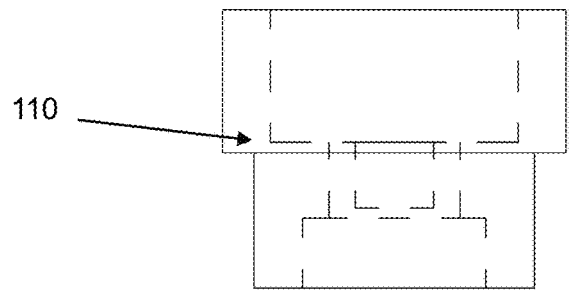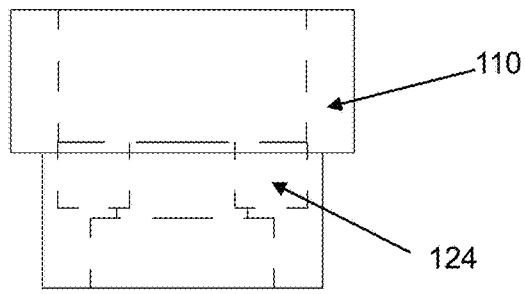
Fig. 6c　　　　　　　Fig. 6d

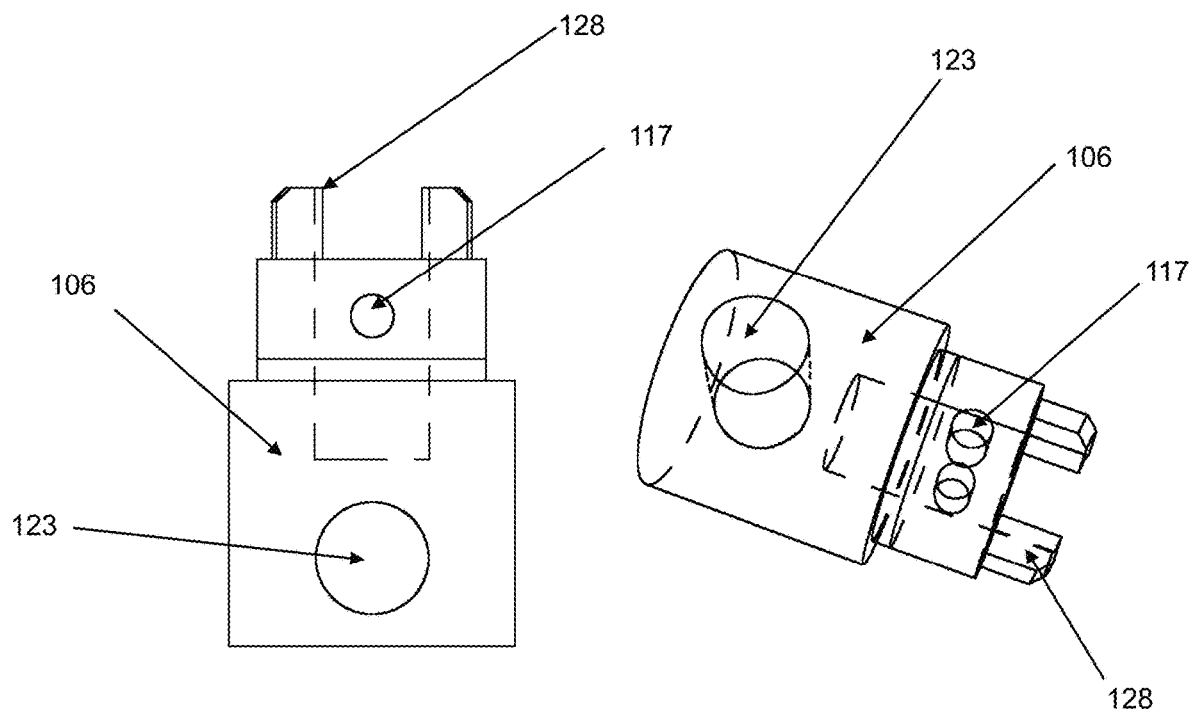
Fig. 8a    Fig. 8b
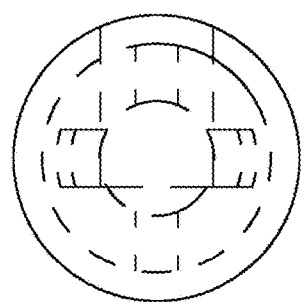    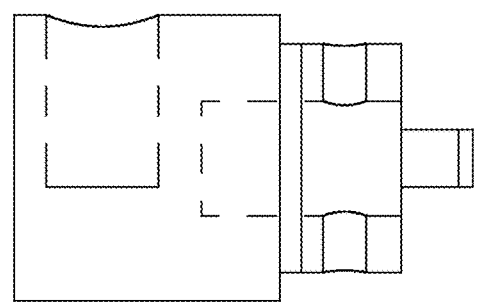
Fig. 8c    Fig. 8d

FOLDING HANDLE RATCHET BINDER WITH TWO PIECE KNOB

BACKGROUND OF THE INVENTION

Field of the Invention

The present invention relates to binding devices that secure or hold down materials or loads during transit. Specifically, ratchet type binders that include two connecting ends, that each connect to a separate securing point and/or anchor point, with a ratchet device located between the two connecting ends. The ratchet device uses a gear mechanism to increase or decrease the distance between the two connecting ends. These connecting ends often include hooks, collared jaws or other connecting mechanism and handles that provide leverage to move the gear mechanism. Some devices include mechanisms that enable switching gear movement to either decrease the distance between the two connecting ends or provide free movement to increase the distance (and thus release the load).

SUMMARY OF THE INVENTION

The present invention is an improved ratchet binder with a folding handle with two connecting ends and includes an enclosed ratchet gear. The direction of rotation of the enclosed ratchet gear is determined by a knob located on the ratchet gear. The knob includes a handle for improved leverage on the knob. The knob may be lifted and rotated 180 degrees to change the direction of rotation from binding a load (decreasing the distance between the connecting ends) or releasing a load (increasing the distance between the connecting ends). A raised knob also allows free motion of the gear for quick release.

The knob is connected to a two sided pawl that engages with the gear. The knob is attached via a pawl attachment pin. The pawl includes a pawl spring to provide tension on the knob and to ensure engagement of the pawl with the ratchet gear.

Further, a knob collar is provided to provide additional stability and protection from materials entering the ratchet gear housing.

BRIEF DESCRIPTION OF THE DRAWINGS

FIGS. 6a-6d are cross-sectional and perspective views of knob collar.

FIGS. 8a-8d are views of a first design of the knob of the present device.

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

Figure 1A:
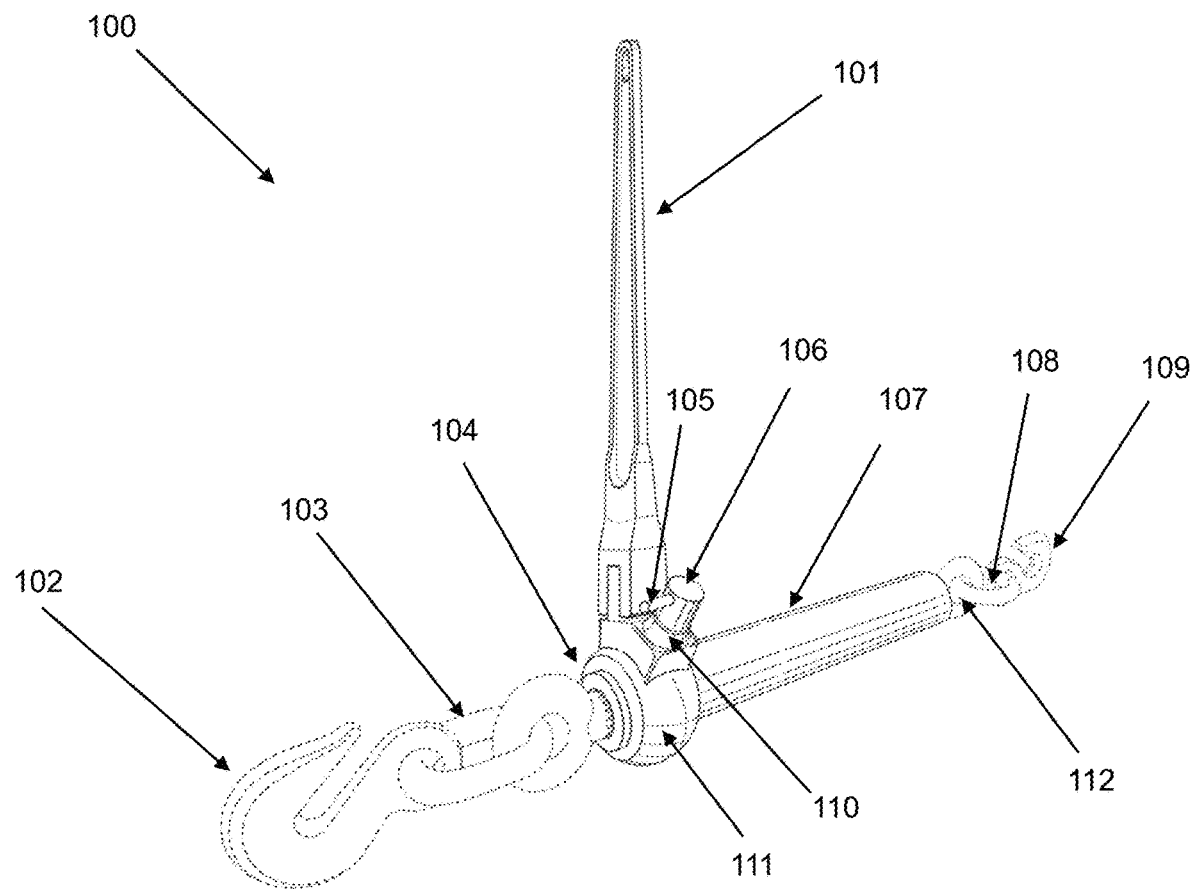
FIG. 1a is a view of the present folding handle ratchet binder with two piece knob with the handle in the up position.

FIG. 1a is a perspective view of folding handle ratchet binder with two piece knob 100 of the present invention. Ratchet binders of this type are utilized to connect two items at first connecting end 102 and second connecting end 109. The ratchet binder allows the user to use the leverage of handle 101 to rotate a ratchet gear contained in ratchet gear housing 111. The ratchet gear has two possible directions of rotation: a first direction (clockwise) and a second direction (counterclockwise). Additionally, the ratchet gear may be set to rotate freely without the gear engaging. The ratchet gear is positioned on the exterior of barrel 107. The movement of the ratchet gear in the first or second directions has the effect of rotating the threaded barrel in the first or second directions. First connecting end 102 and second connecting end 109 are attached to first link 103 and second link 108 respectively. First link 103 and second link 108 are attached to first threaded connector 104 and second threaded connector 112 respectively. First threaded connector 104 and second threaded connector 112 have complementary threads that couple to the threads on threaded barrel 107. Rotation of the threaded barrel 107 in the first direction or second direction of moving first threaded connector 104 and second threaded connector 112 either up or down their threads. This movement either increases or decreases the distance between first connecting end 102 and second connecting end 109. The decrease in distance utilized to create tension between the two ends of the ratchet binder to secure materials during transport or for various other reasons. The increase in distance is used to reduce and remove tension to allow removal and repositing of the ratchet binder. Free motion of the ratchet gear allows quick increases in the distance between the first and second connecting ends thus allowing for quick repositioning. Clear details of the ratchet gear and threaded barrel will be shown in reference to later figures.

Knob 106 controls the direction of movement of the ratchet gear. In a first position, knob 106 allows the ratchet gear to move in the first direction. In a second position, knob 106 allows the ratchet gear to move in the second direction. In a third position, knob 106 allows free rotation of the ratchet gear. Knob 106 includes knob handle 105 which allows easier gripping of knob 106 by the user. Knob 106 is lifted and rotated by the user to the first, second and third positions. Knob 106 is connected to a pawl with two sides: the first that firmly engages the ratchet gear and allows the leverage of the handle to be applied directly to the threaded barrel and the second that allows the gears to pass the pawl. If the pawl is disengaged completely from the gear, free rotation is allowed. Knob 106 also includes knob collar 110 that prevents material from entering the ratchet gear.

Figure 1B:
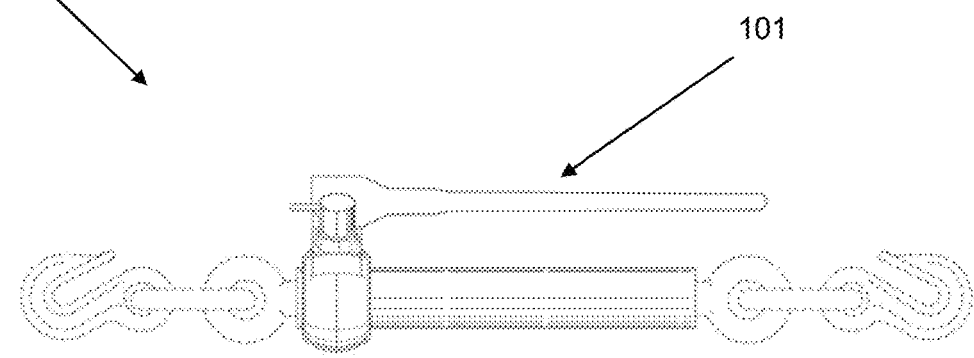
FIG. 1b is a view of the present folding handle ratchet binder with two piece knob with the handle folded.

This view includes handle 101, in this view in the first position for use of the ratchet binder. Handle 101 may also be folded as shown in FIG. 1b.

First connecting end 102 and second connecting end 109 are hooks in this view but could be any suitable connecting device known to one of ordinary skill in the art such as closed rings, eyes, collared jaws with screw enclosures, towing hooks, towing hook clusters, shock absorbers, shock absorbers including any end fitting described herein, links, chain, chain including any end fitting described herein and custom designed end fittings for proprietary applications. The pieces of the ratchet binder are typically made of strong metals such as steel and iron, including carbon steel, chromium steel and chromium-molybdenum steels in the preferred embodiment, though strong alloys including those containing aluminum may also be used. Materials such as bronze may be used for no-spark applications such as mining. Manufacturing methods used for the ratchet binder including stamping, forging, machining, milling, welding, casting including steel casting, hot forging, cold forging and other methods of forming metals well known in the art.

Figure 2:
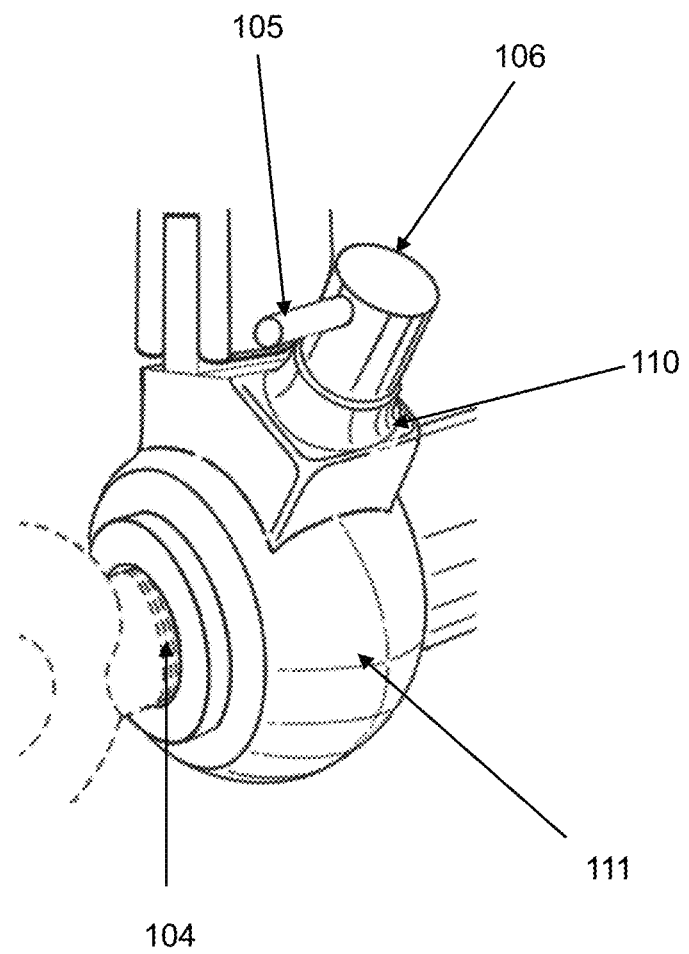
FIG. 2 is a view of the ratchet gear housing and knob with handle.

FIG. 2 is a close-up view of ratchet gear housing 111, knob 106, knob handle 105, knob collar 110 and first threaded connector 104. In this view, the constituent parts are visible, with the ratchet gear contained within ratchet gear housing. Knob 106 is lifted by knob handle 105 to be turned to the first, second and third positions, allowing gear rotation in the first and second directions as well as free rotation.

Figure 3:
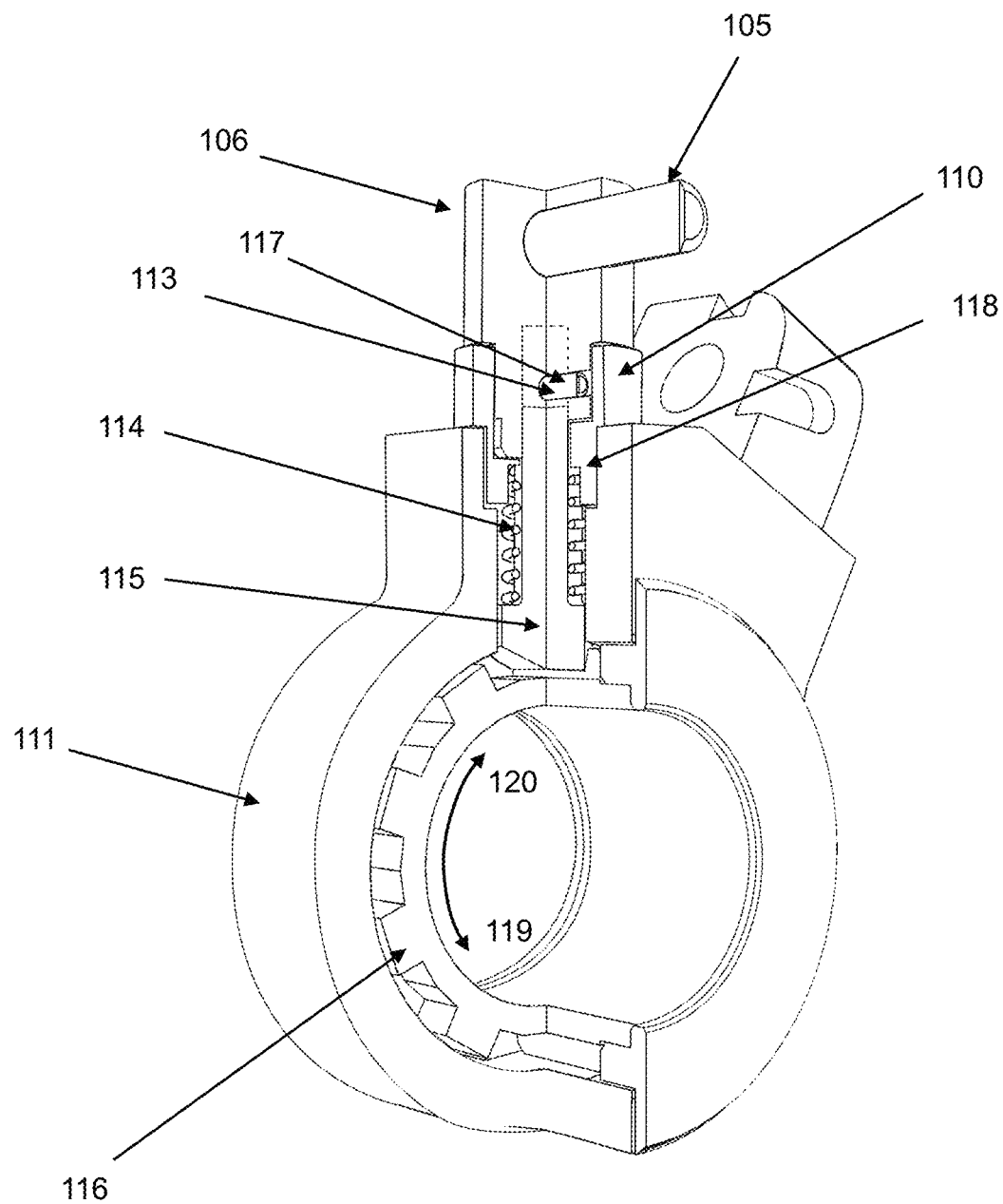
FIG. 3 is a cross section of the ratchet gear housing and two piece knob.

FIG. 3 is a detailed cutaway view of ratchet gear housing 111. Knob 106 is located at the top of the housing, with knob handle 105 inserted in a complementary aperture formed in knob 106. Pawl 115 is formed with a fitting at the top that is formed to slot into a matching aperture at the base of knob 106. Further, pawl pin aperture 117 is formed through the top of pawl 115 and into the base of knob 106. Pawl pin aperture 117 is sized to fit pawl attachment pin 113, which when in place, secures knob 106 to pawl 115. The base of pawl 115 engages with ratchet gear 116 to allow ratchet gear 116 to move in first direction 119 or second direction 120 depending on the orientation of the pawl end. More detail related to pawl 115 is disclosed in relation to FIG. 5. Pawl spring 114 provides return force after knob 106 is lifted by the user to maintain engagement between pawl 115 and ratchet gear 116. Knob collar 110 is a circular ring shaped device that fits around the shaft of knob 106 as well as the upper portion of pawl 115. Knob collar 110 includes an upper portion with a larger circumference and a lower portion with a smaller circumference sized to fit in a complementary knob aperture 118 formed in the ratchet gear housing 111. Knob collar 110 may be attached by welding, friction-fit, or other attachment methods well known in the art.

Knob 106, ratchet gear housing 111, ratchet gear 116, pawl 115, knob handle 105 and pawl attachment pin 113 are all formed of a strong metal such as steel, stainless steel or aluminum alloy. These pieces are formed by stamping, forging, machining, milling, welding, casting including steel casting, hot forging, cold forging as in the preferred embodiment, but any method well known in the art may be used.

Figure 4:
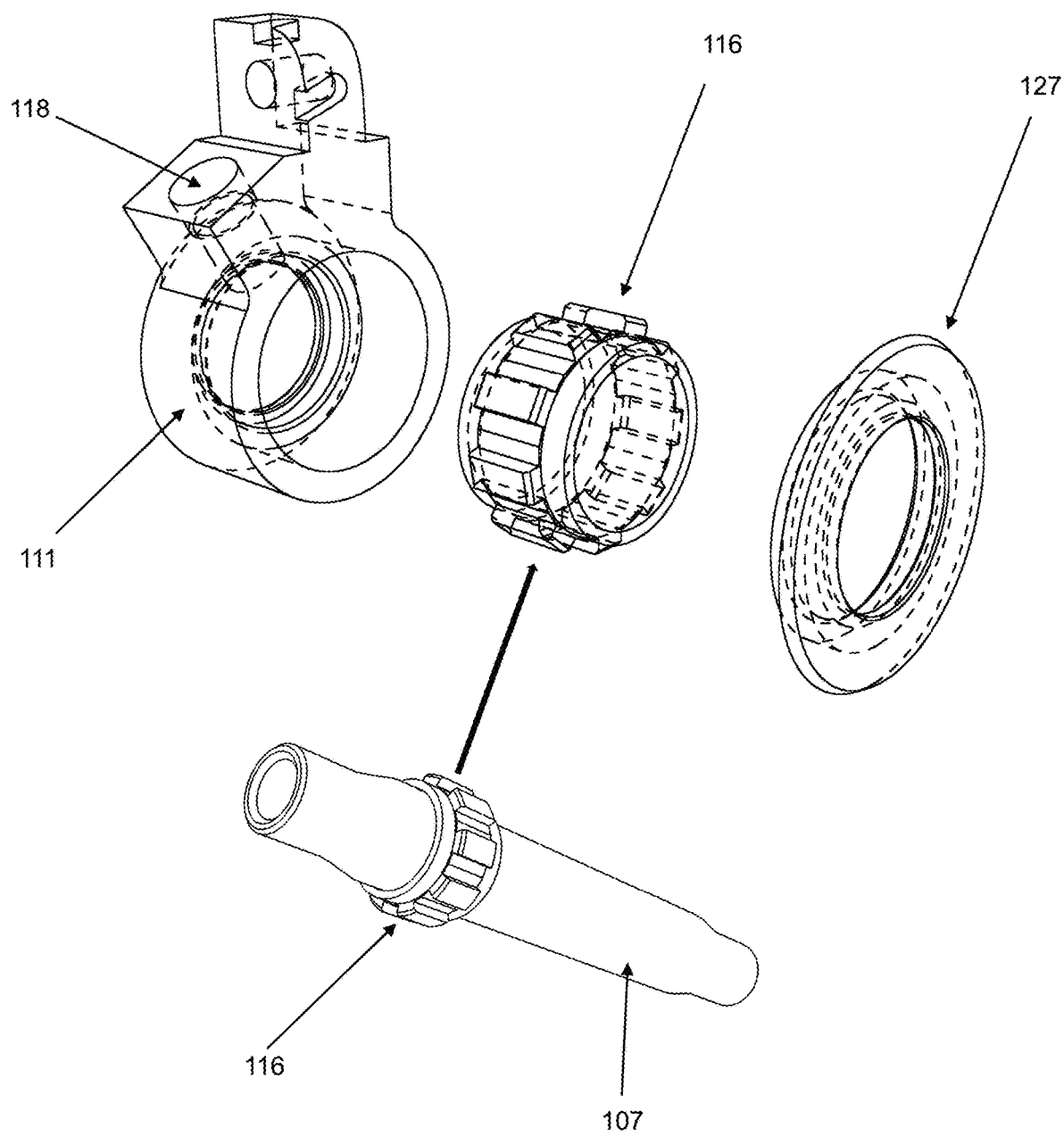
FIG. 4 is an exploded view of the ratchet gear housing, ratchet gear and barrel.

FIG. 4 is an expanded view of the components contained within ratchet gear housing 111. In this view, ratchet gear 116 is fully visible and is a typical gear with rectangularly shaped gear teeth that may be used to either rotate or stop the gear from rotating. Further, ratchet gear 116 is shown attached to threaded barrel 107. Threaded barrel 107 has female threads at both ends that couple with complementary male threads on first threaded connector 104 and second threaded connector 112. As discussed above, rotation of threaded barrel 107 causes rotation of the threads and thus movement of first threaded connector 104 and second threaded connector 112 toward or apart from each other. Knob aperture 118 is clearly visible in this view and shows the aperture for knob 106. Further, ratchet housing cap 127 is also shown. Ratchet housing cap covers the end of the housing once the gear is assembled and serves to protect the internal mechanical elements of ratchet gear 116.

Figure 5:
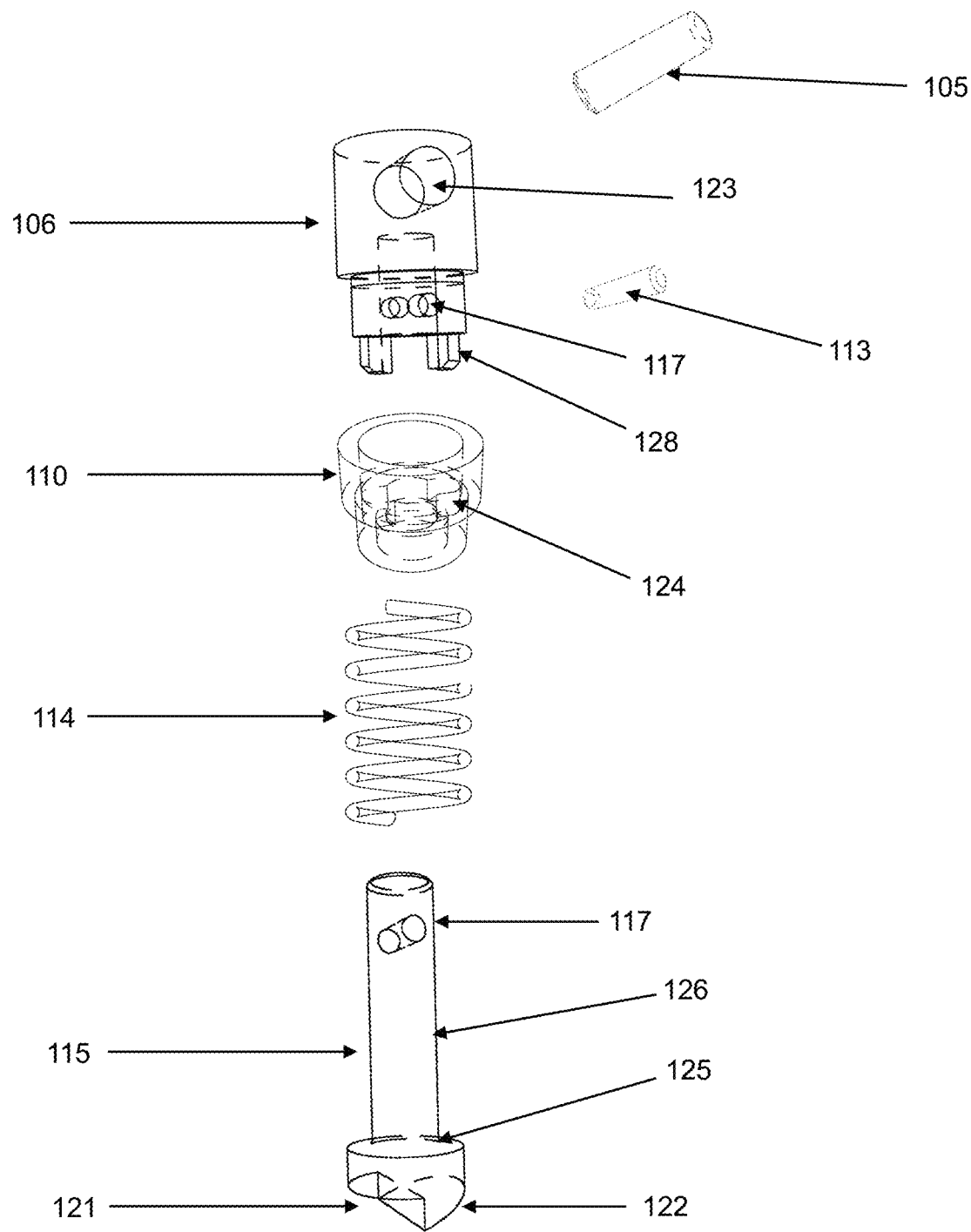
FIG. 5 is an exploded view of the two piece knob with pawl.

FIG. 5 is an expanded view of the components of knob 106 and pawl 115. Knob 106 is shown with knob handle 105 removed from knob handle aperture 123. In its assembled state, knob handle 105 is placed with in knob handle aperture 123 for use as a handle. Further, pawl attachment pin 113 is shown removed from pawl pin aperture 117. Pawl pin aperture 117 is formed in the base of knob 106 and the top of pawl 115. When pawl 115 is fitted in the complementary coupling location in the base of knob 106 and pawl pin aperture 117 aligned, pawl attachment pin 113 may be fitted in pawl pin aperture 117 to couple knob 106 and pawl 115. In this way, the rotation of knob 106 controls the position of pawl 115 in relation to ratchet gear 116. Two knob tabs 128 are formed at the base of knob 106 and fit in complementary sized knob wells 124 formed on the inside of knob collar 110.

Knob collar 110 is a circular ring-shaped device that fits around the shaft of knob 106 as well as the upper portion of pawl 115. Knob collar 110 includes an upper portion with a larger circumference and a lower portion with a smaller circumference sized to fit in a complementary knob aperture 118 formed in the ratchet gear housing 111. Knob collar 110 may be attached by welding, friction-fit or other attachment methods well known in the art. Knob collar 110 includes one or more knob wells 124 that couple with knob tabs 128 to secure knob collar 110 to knob 106. Further, knob collar may or may not include pawl pin apertures 117 to allow fitment of the knob attachment pin 113 through the knob collar 110.

Pawl spring 114 is fitted over pawl 115 and provides tension against pawl head 125 with that tension providing the necessary force to couple the pawl head 125 to the teeth of ratchet gear 116. Further, when the user lifts knob 106 to change the orientation of pawl 115, pawl spring 114 provides return force and tension to ensure that the pawl head is coupled with the teeth of ratchet gear 116 when the knob 106 is no longer lifted.

Pawl 115 is comprised of a circular pawl shaft 126 attached to pawl head 125. Pawl shaft 126 includes pawl pin aperture 117 to allow fitment of knob attachment pin 113 through pawl shaft 126 and attach pawl 115 to knob 106. Pawl head 125 is comprised of gear notch 121 on a first side and gear slide 122 on a second side. Gear notch 121 is an L shaped notch formed around central right angle. Gear notch 121 is sized to be complementary in size and shape to the gears formed on ratchet gear 116. When coupled, gear teeth from gear ratchet 116 fits within the right angle notch on gear notch 121. When gear ratchet 116 rotates such that a gear located on gear ratchet 116 fits within gear notch 121, further rotation of the gear ratchet 116 in that direction is stopped. On the opposite side of pawl head 125 from gear notch 121 is gear slide 122. Gear slide 122 is essentially triangularly shaped, and may include a curve, such that the hypotenuse of the triangle is in contact with a gear located on gear ratchet 116. When this gear engages with gear slide 122, the edge of the gear is pushed along the length of gear slide 122, pushing pawl 115 upward and out of the path of ratchet gear 116. This allows free rotation of gear ratchet 116 in the direction where the gears engage with gear slide 122, rather than gear notch 121. When the user lifts knob 106 and turns knob 180 degrees, this allows the user to position either gear notch 121 or gear slide 122 in the desired direction of rotation or hold of ratchet gear 116.

FIGS. 6a-6d show perspective and cross section views of knob collar 110 showing knob wells 124. Knob wells 124 couple with knob tabs 128 to rotationally secure knob 106 to knob collar 110. In this case, two knob wells 124 are shown, but any number of knob wells 124 could be included. When knob tabs 128 are seated in knob wells 124, if knob 106 is rotated, knob collar 110 follows the direction of rotation.

Figures 7A, 7B:
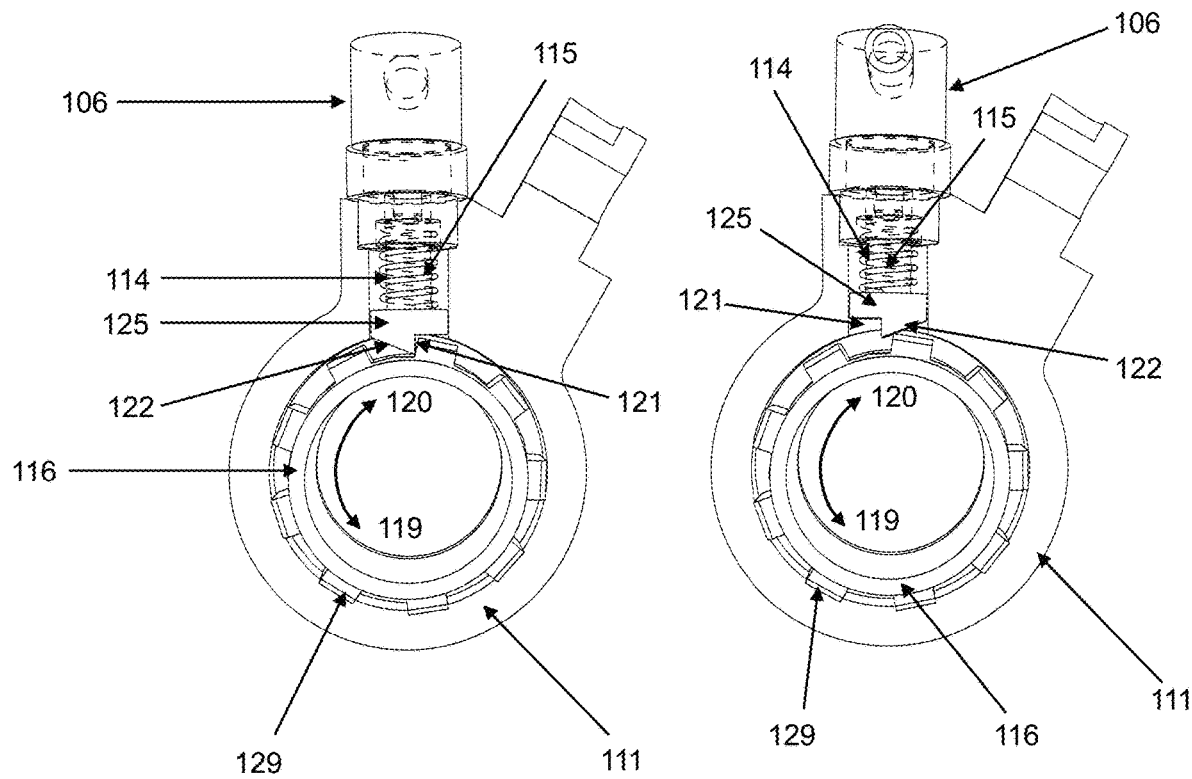
FIG. 7a is a cross-sectional view of ratchet gear mechanism with pawl head in a first position.
FIG. 7b is a cross-sectional view of ratchet gear mechanism with pawl head in a second position.
Figures 9A, 9B:
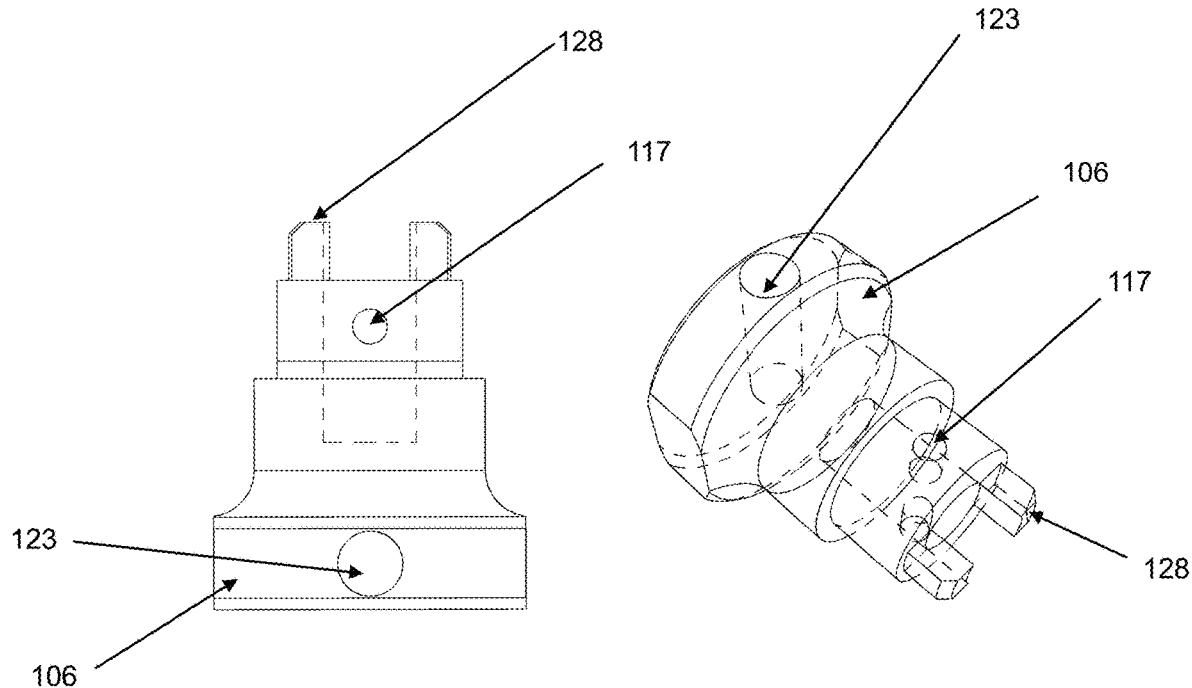
FIGS. 9a-9d are views of a second design of the knob of the present device.
Figures 9C, 9D:
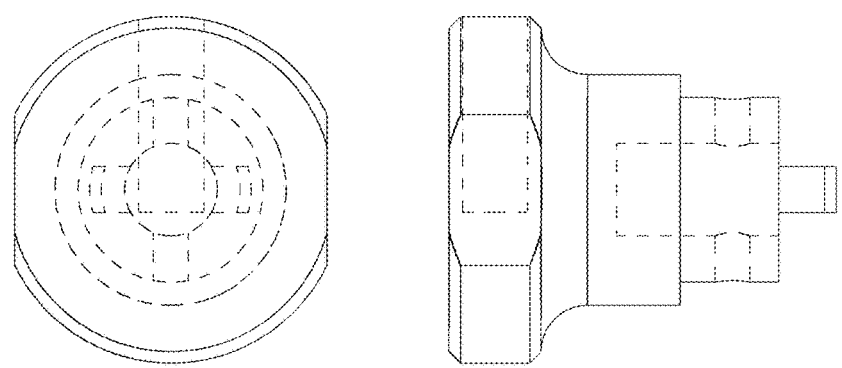
Figure 10A:
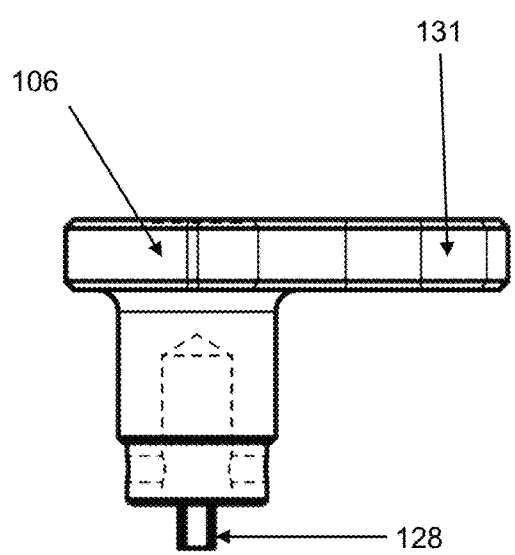
FIGS. 10a-10d are views of a third design of the knob of the present device.
Figure 10B:
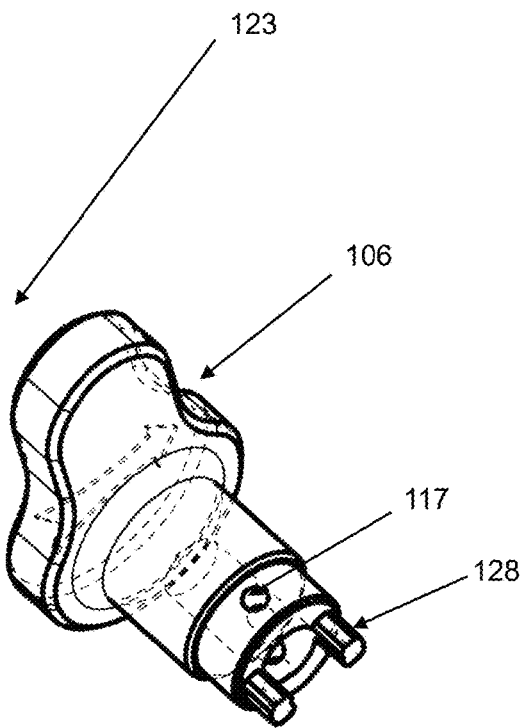
Figure 10C:
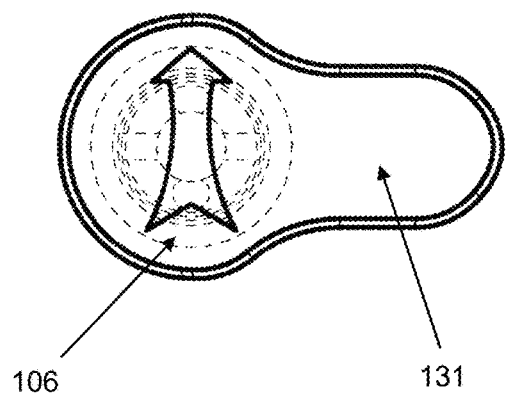
Figure 10D:
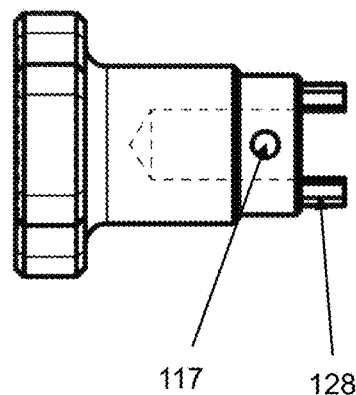

FIGS. 7a and 7b shows a cross section of ratchet housing 111 showing ratchet gear 116, ratchet teeth 129, pawl 115, pawl spring 114, pawl head 125, gear slide 122 and gear notch 121. In this view, the interaction between ratchet teeth 129, gear notch 121 and gear slide 122 is shown. In FIG. 7a, pawl head 125 is oriented in a first position that locks ratchet gear 116 from moving in first direction 119. With pawl head 125 in this first position, gear notch 121 is coupled with gear teeth 129 such that ratchet gear 116 cannot rotate in first direction 119. However, gear slide 122 will allow gear teeth 129 to push pawl head 125 upward and allow rotation in second direction 120. In FIG. 7b, knob 106 has been lifted and rotated to move pawl head 125 to a second position. In this second position, gear slide 122 allows ratchet gear 116 to rotate in first direction 119. Gear notch 121 couples with gear teeth 129 to prevent rotation in second direction 120.

FIGS. 8a-8d show side, perspective, top and bottom views of a first design of knob 106. In this view, knob 106 is shown with knob handle 105 (not shown) removed from knob handle aperture 123. In its assembled state, knob handle 105 is placed with in knob handle aperture 123 for use as a handle. Pawl pin aperture 117 is formed in the base of knob 106 and the top of pawl 115 (not shown). When pawl 115 is fitted in the complementary coupling location in the base of knob 106 and pawl pin aperture 117 aligned, pawl attachment pin 113 (not shown) may be fitted in pawl pin aperture 117 to couple knob 106 and pawl 115. In this way, the rotation of knob 106 controls the position of pawl 115 in relation to ratchet gear 116. Two knob tabs 128 are formed at the base of knob 106 and fit in complementary sized knob wells 124 formed on the inside of knob collar 110.

FIGS. 9a-9d show side, perspective, top and bottom views of a second design of knob 106. This knob design has a different shaped knob 106 but is otherwise functionally similar to the other knob 106 disclosed. In this view, knob 106 is shown with knob handle 105 (not shown) removed from knob handle aperture 123. In its assembled state, knob handle 105 is placed with in knob handle aperture 123 for use as a handle. Pawl pin aperture 117 is formed in the base of knob 106 and the top of pawl 115 (not shown). When pawl 115 is fitted in the complementary coupling location in the base of knob 106 and pawl pin aperture 117 aligned, pawl attachment pin 113 (not shown) may be fitted in pawl pin aperture 117 to couple knob 106 and pawl 115. In this way, the rotation of knob 106 controls the position of pawl 115 in relation to ratchet gear 116. Two knob tabs 128 are formed at the base of knob 106 and fit in complementary sized knob wells 124 formed on the inside of knob collar 110.

FIGS. 10a-10d show side, perspective, top and bottom views of a third design of knob 106. In this embodiment, knob 106 includes knob grip 131 which is an oblong region extending from knob 106 to provide additional grip leverage for the user. As with the other knob designs, pawl pin aperture 117 is formed in the base of knob 106 and the top of pawl 115 (not shown). When pawl 115 is fitted in the complementary coupling location in the base of knob 106 and pawl pin aperture 117 aligned, pawl attachment pin 113 (not shown) may be fitted in pawl pin aperture 117 to couple knob 106 and pawl 115. In this way, the rotation of knob 106 controls the position of pawl 115 in relation to ratchet gear 116. Two knob tabs 128 are formed at the base of knob 106 and fit in complementary sized knob wells 124 formed on the inside of knob collar 110.

Figure 11A:
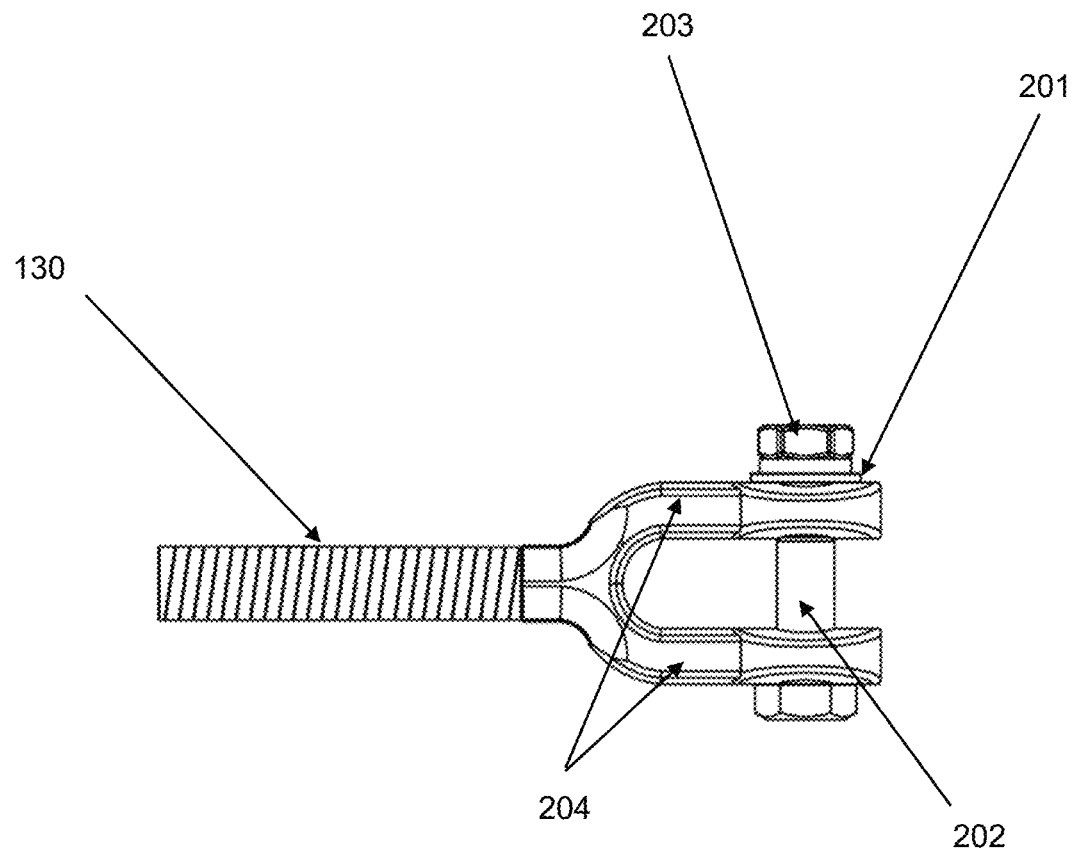
FIGS. 11a-11b are views of a collared jaw with screw enclosure connecting end.
Figure 11B:
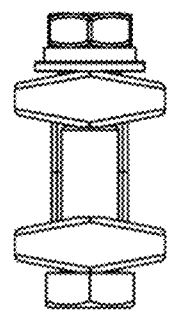

FIGS. 11a-11b show a collared jaw with screw enclosure 201 type of first connecting end 102 and second connecting end 109. This connecting end is comprised of a threaded end 130 which is equivalent to first threaded end 104 and second threaded end 112 shown in FIG. 1. Threaded end 130 is comprised of threads that complementary to the threads of threaded barrel 107 such that threaded end 130 couples with threaded barrel 107. Collared jaw with screw enclosure 201 is comprised of jaws 204, screw 202 and nut 203. Jaws 204 are fitted over a complementary connector to be attached to this connecting end, then screw is threaded through jaws 202 and secured by nut 203.

Figure 12:
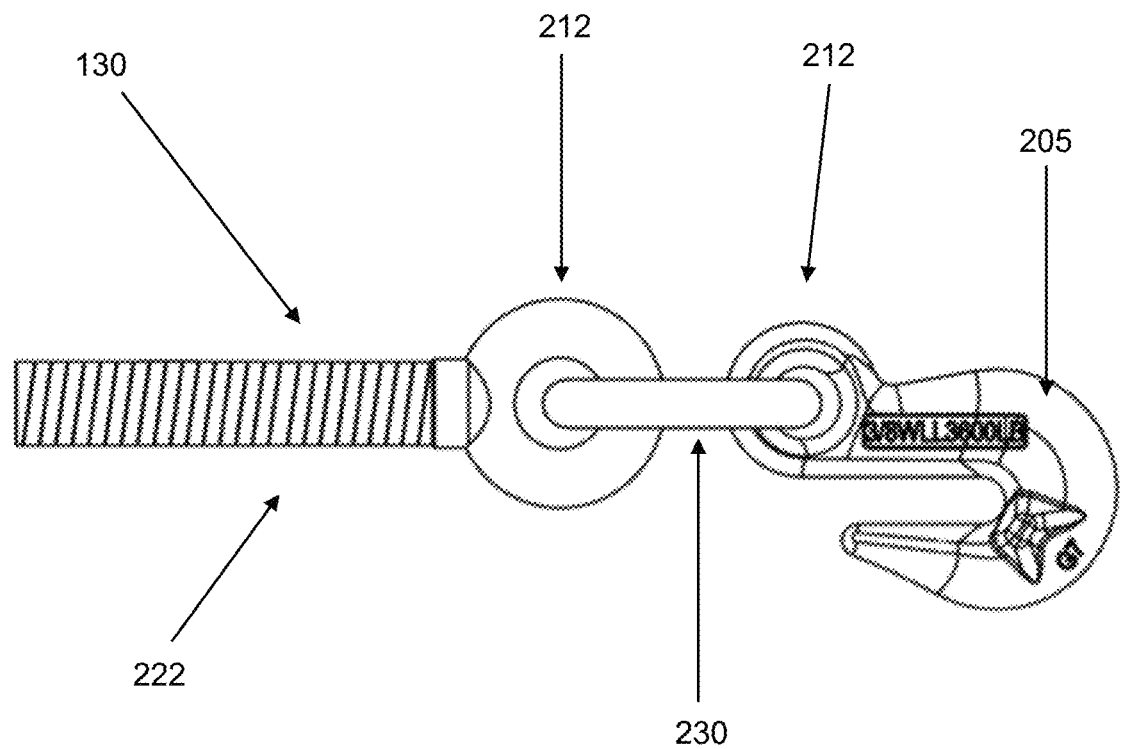
FIG. 12 is a view of a cradle grab hook connecting end.

FIG. 12 shows a cradle grab hook 205 type of first connecting end 102 and second connecting end 109. This type of connecting end is comprised an eye bolt 222, a welded link 230 and cradle grab hook 205. Eye bolt 222 is comprised of threaded end 130 and eye 212. Cradle grab hook 205 also includes an eye 212 allowing the hook to be connected to other components. Cradle grab hook 205 is connected to eye bolt 222 by welded link 230 which is threaded through eye 212 of the eye bolt 222 and eye 212 of the cradle grab hook 205 and welded closed. Cradle grab hook 205 is a specific hook style with bulges on each side. A cradle grab hook 205 always connects to a closed ring/end fitting eye via a welded link.

Figure 13:
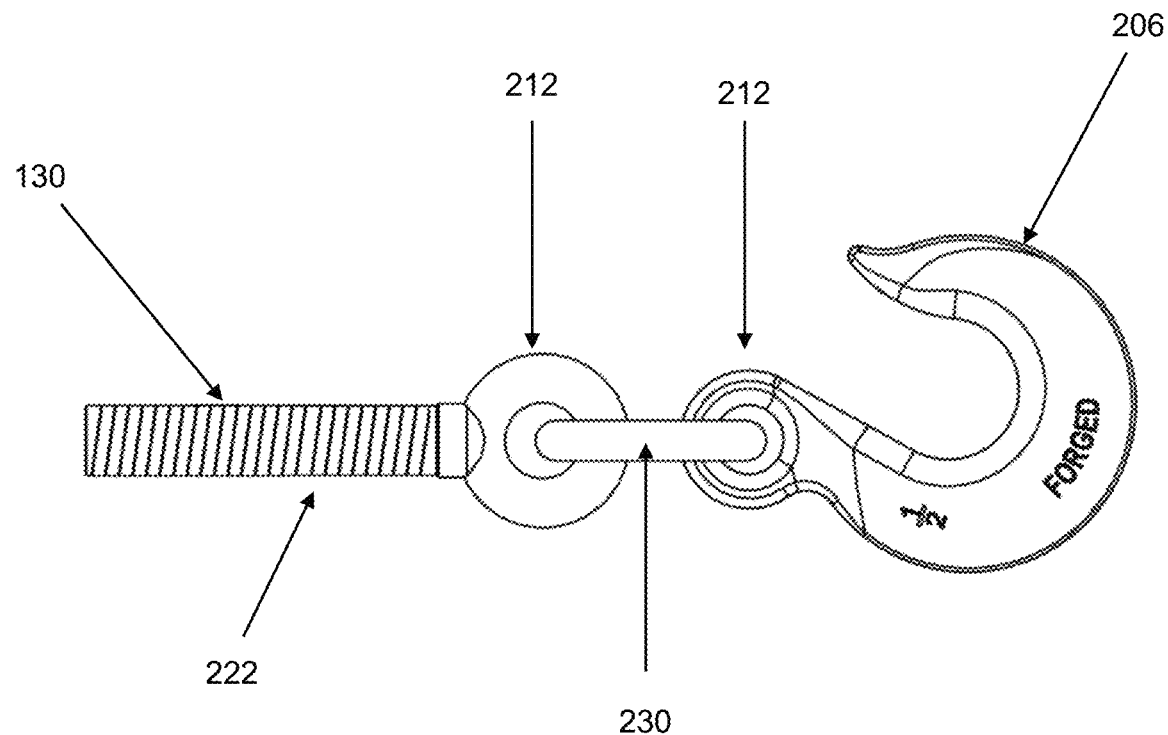
FIG. 13 is a slip hook connecting end.

FIG. 13 shows a slip hook 206 type of first connecting end 102 and second connecting end 109. This type of connecting end is comprised of an eye bolt 222, a welded link 230 and slip hook 206. Eye bolt 222 is comprised of threaded end 130 and eye 212. Slip hook 206 also includes an eye 212 allowing the hook to be connected to other components. Slip hook 206 is connected to eye bolt 222 by welded link 230 which is threaded through eye 212 of the eye bolt 222 and eye 212 of the slip hook 206 and welded closed. Slip hook 206 is a specific hook style that has a contoured inner hook curvature and a much wider gap in the open end of the hook than a typical hook.

Figure 14:
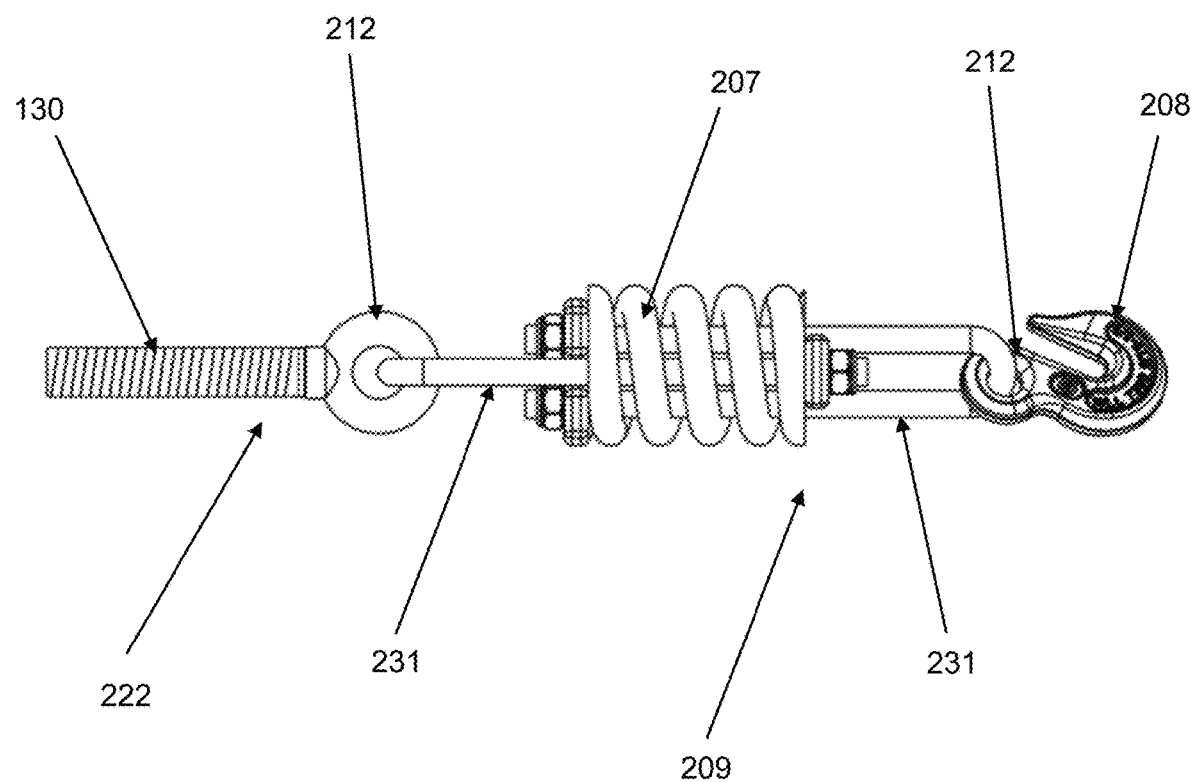
FIG. 14 is a shock absorber connecting end.

FIG. 14 shows a shock absorber with hook 209 type of first connecting end 102 and second connecting end 109. This type of connecting end is comprised of an eye bolt 222, connecting loops 231, shock absorber 207 and grab hook 208. Eye bolt 222 is comprised of threaded end 130 and eye 212. Grab hook 208 also includes an eye 212. A first connecting loop 231 is threaded through the eye 212 of eye bolt 222 and a second connecting loop 231 is threaded through the eye 212 of grab hook 208. Both connecting loops 231 are welded closed to secure eye bolt 222 and grab hook 208 to shock absorber 207. Shock absorber with hook 209 may be used to secure loads on trucks or other transport means where there may be shock impacts. The shock absorber 207 provides a degree of movement that lessens the potential for damage to a particular load that may be caused by an impact.

Figure 15:
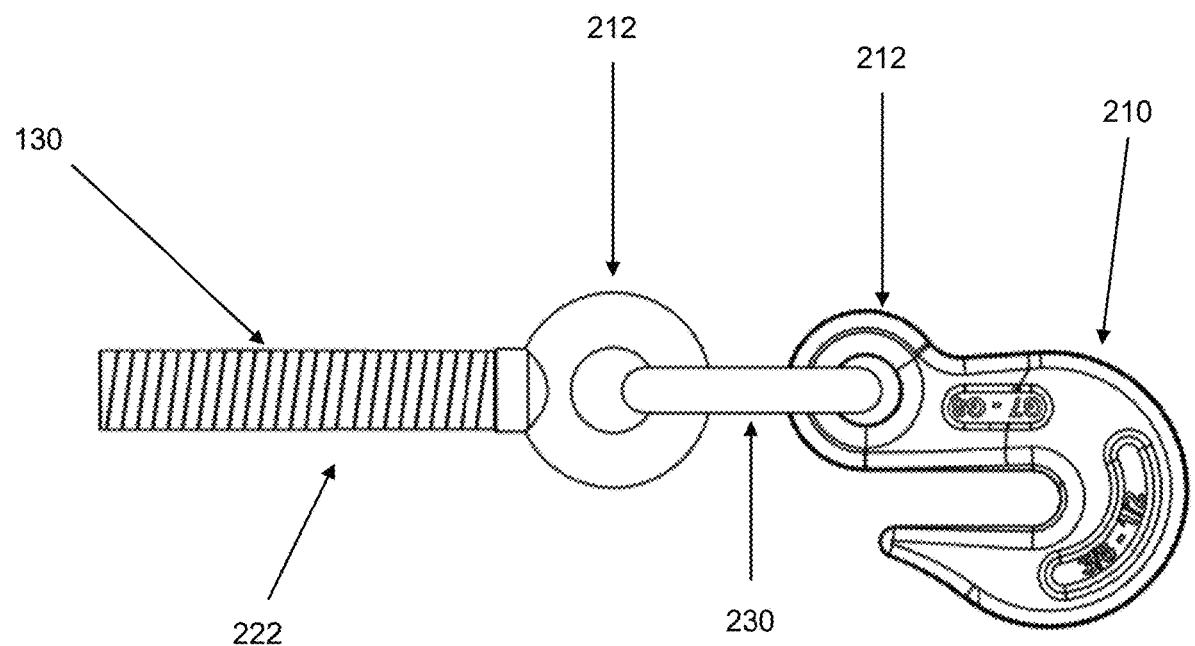
FIG. 15 is a flat hook connecting end.

FIG. 15 shows a flat grab hook 210 type of first connecting end 102 and second connecting end 109. This type of connecting end is comprised of an eye bolt 222, a welded link 230 and flat grab hook 210. Eye bolt 222 is comprised of threaded end 130 and eye 212. Flat grab hook 210 also includes an eye 212 allowing the hook to be connected to other components. Flat grab hook 210 is connected to eye bolt 222 by welded link 230 which is threaded through eye 212 of the eye bolt 222 and eye 212 of the flat grab hook 210 and welded closed. Flat grab hook 210 is a common and typical end fitting when a hook is needed to secure a load.

Figure 16:
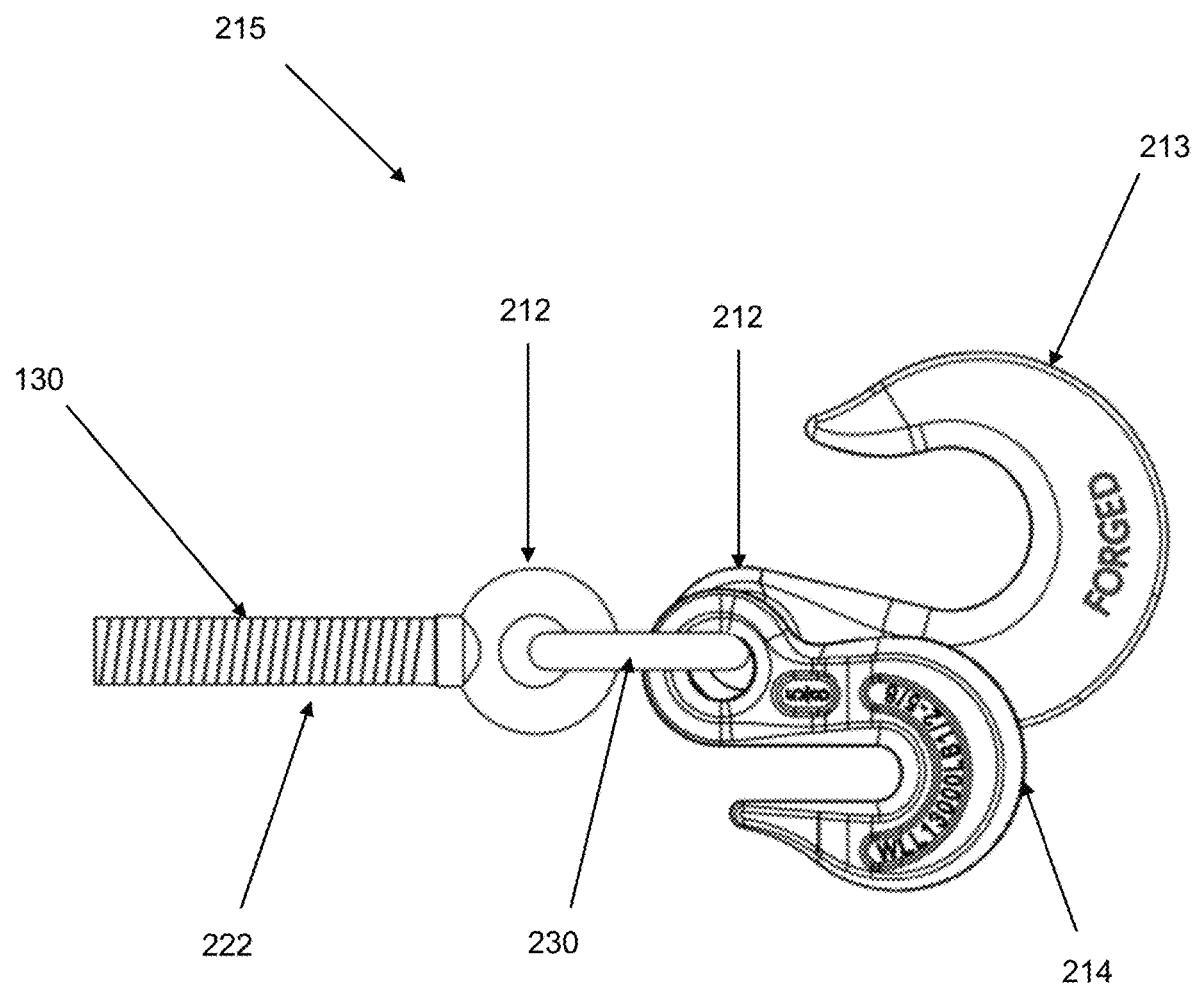
FIG. 16 is a grab and slip hook combination connecting end.

FIG. 16 shows a grab and slip hook combination 215 type of first connecting end 102 and second connecting end 109. This type of connecting end is comprised of an eye bolt 222, a welded link 230, slip hook 213 and grab hook 214. Eye bolt 222 is comprised of threaded end 130 and eye 212. Slip hook 213 and grab hook 214 both also include an eye 212 allowing the hooks to be connected to other components. Both slip hook 213 and grab hook 214 are connected to eye bolt 222 by welded link 230 which is threaded through eye 212 of the eye bolt 222 and eye 212 of the slip hook 213 and grab hook 214 and welded closed. This slip and grab hook combination 215 is used for complex securing applications that require more than one hook of various types.

Figure 17:
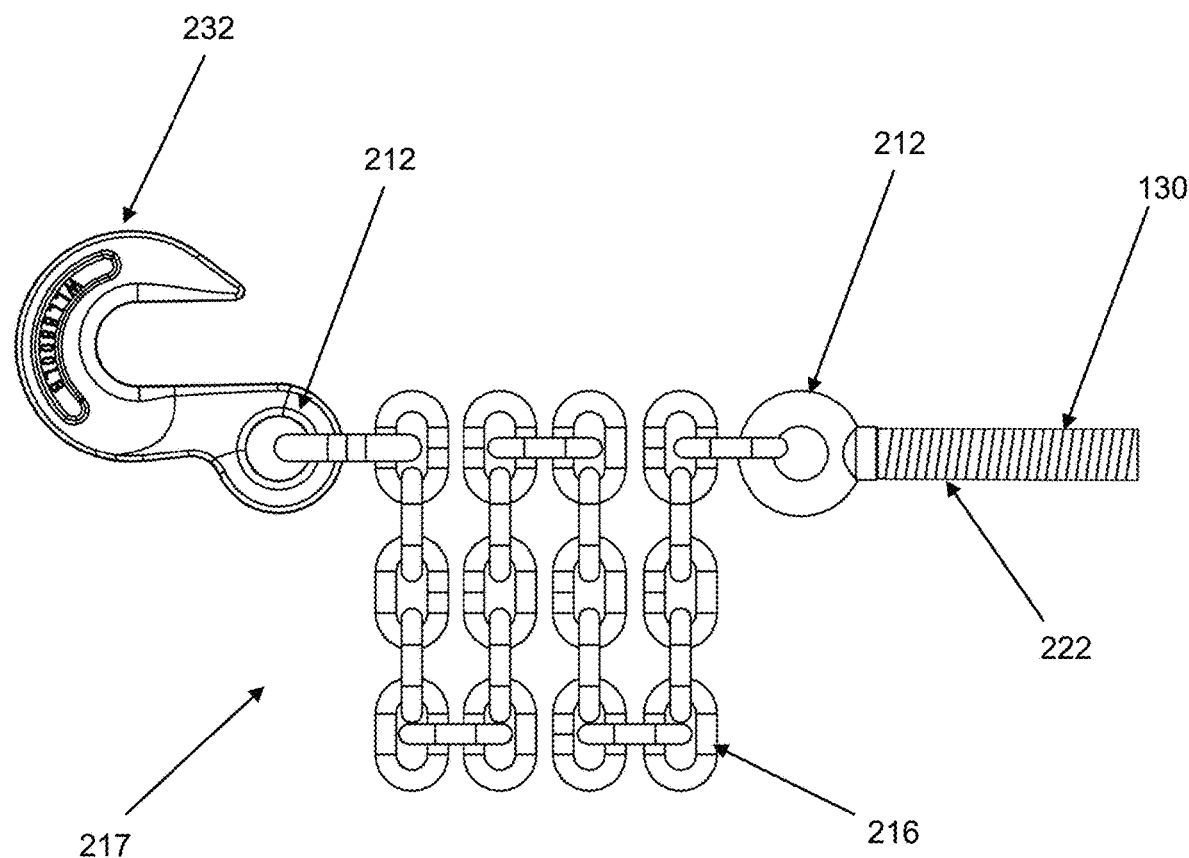
FIG. 17 is a chain and sling hook connecting end.

FIG. 17 shows a chain and hook combination 217 type of first connecting end 102 and second connecting end 109. This type of connecting end is comprised of an eye bolt 222, a chain 216 and sling hook 232. Eye bolt 222 is comprised of threaded end 130 and eye 212. Sling hook 232 also includes an eye 212 allowing the hook to be connected to other components. Sling hook 232 is connected to eye bolt 222 by chain 216, a link of which is threaded through eye 212 of the eye bolt 222 and eye 212 of the sling hook 232 and welded closed. Chain 216 may be of any size known in the art including chains with diameters measuring 5/16", 3/8", 1/2", 5/8", and 3/4." Metric size chains may also be utilized. Various grades of steel and/or alloy such as G43, G70, G80, G100, or Grade 120 may be used. This chain and hook combination 217 is utilized for situations where a length of chain may be needed between the binder and hook at the end.

Figure 18:
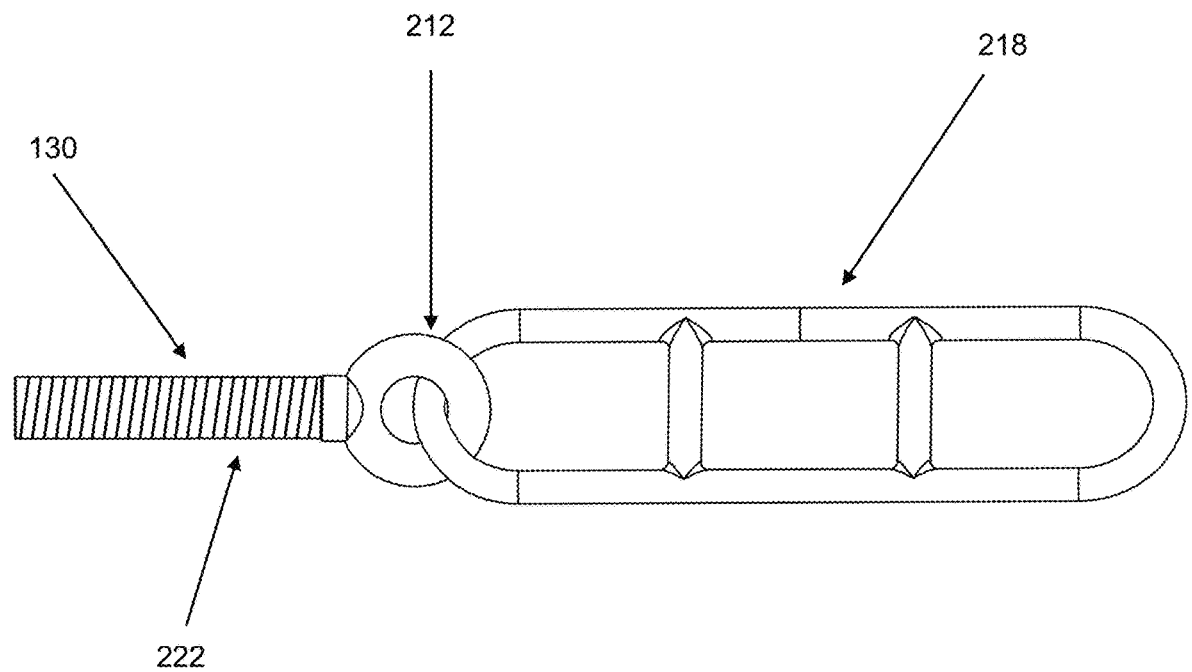
FIG. 18 is a loop connecting end.

FIG. 18 shows a loop 218 type of first connecting end 102 and second connecting end 109. This type of connecting end is comprised of an eye bolt 222 and loop 218. Eye bolt 222 is comprised of threaded end 130 and eye 212. Loop 218 is connected to eye bolt 222 by threading loop 218 through eye 212 of the eye bolt 222 and welding loop closed. This loop 218 may be utilized in a variety of lengths and diameters.

Figure 19:
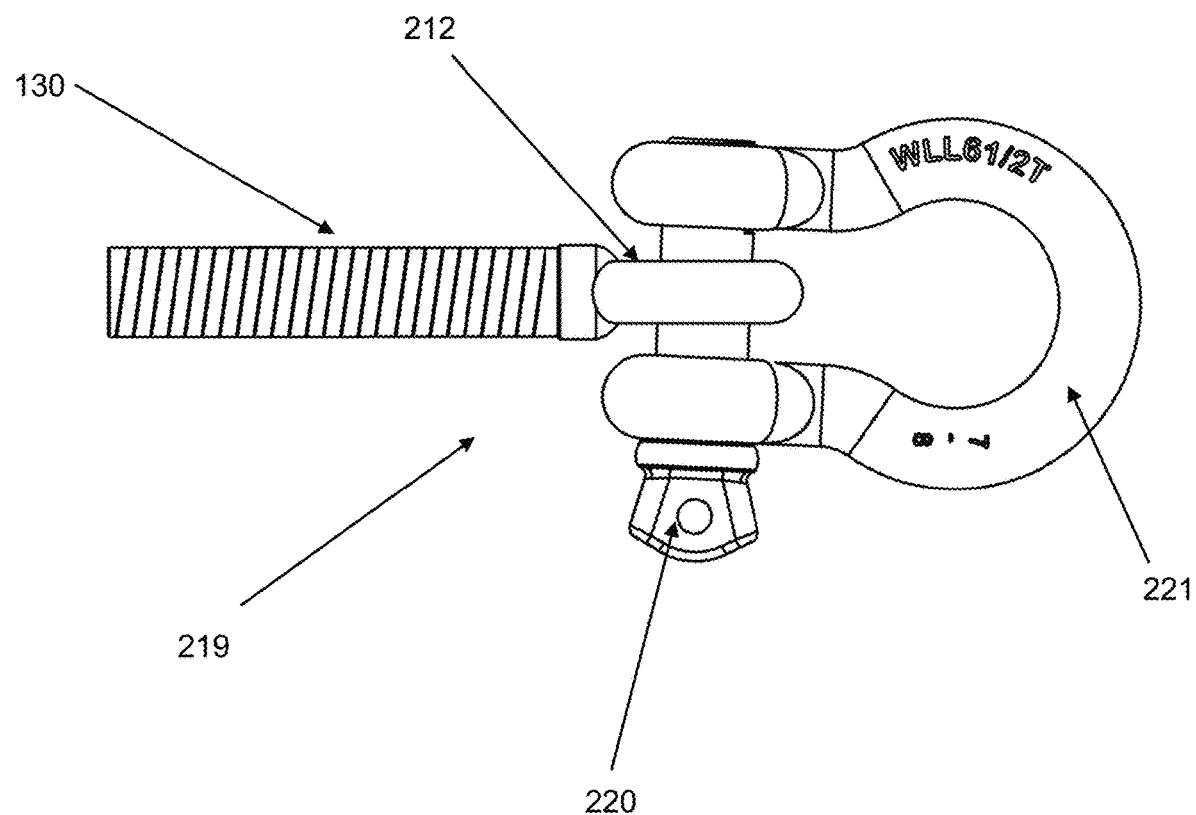
FIG. 19 is an anchor shackle connecting end.

FIG. 19 shows an anchor shackle 219 type of first connecting end 102 and second connecting end 109. This type of connecting end is comprised of a threaded end 130, an eye 212, shackle 221 and shackle pin 220. The shackle pin 220 is threaded through eye 212 and through the open ends of the shackle 221. The shackle pin 220 may be secured by a threaded end which fits in a complementary threaded coupling on one open end of the shackle (as shown, screw pin anchor shackle) or by a nut fitted on the threaded end (bolt type anchor shackle). This anchor shackle 219 may be utilized in a variety of sizes and shapes.

Figure 20:
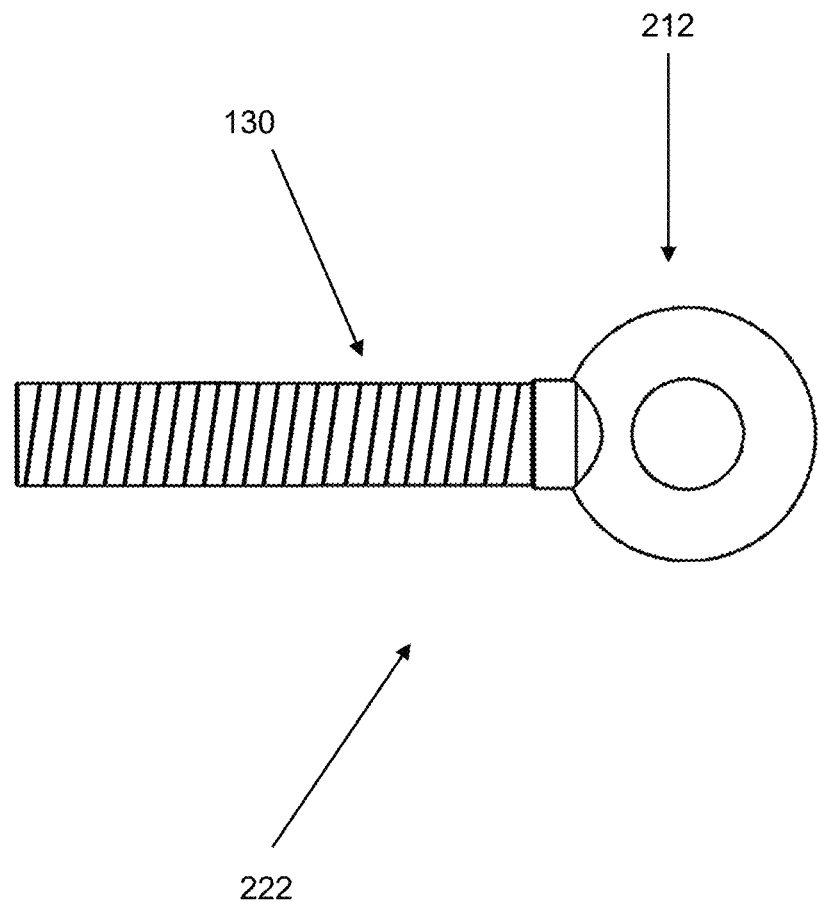
FIG. 20 is an eye bolt connecting end.

FIG. 20 shows an eye bolt 222 type of first connecting end 102 and second connecting end 109. This type of connecting end is comprised of a threaded end 130 and an eye 212. As shown in many other varieties of first connecting 102 and second connecting end 109, an eye bolt 222 is a common attachment point for other types of connecting ends as disclosed herein.

Figure 21:
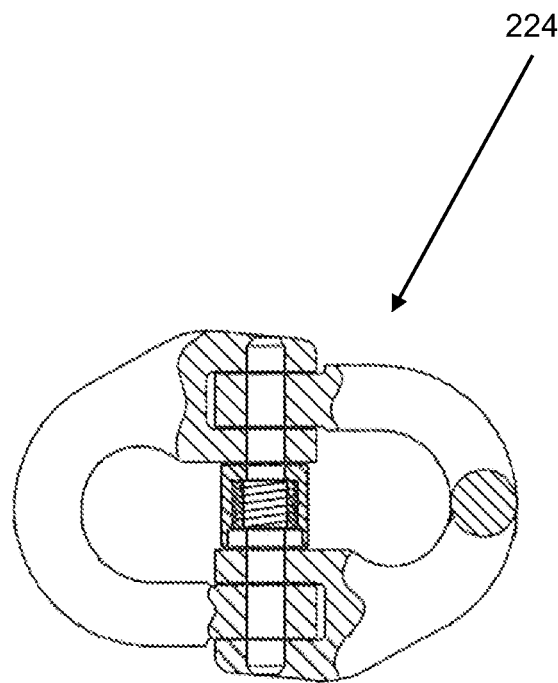
FIG. 21 is a tow hook connecting end.

FIG. 21 shows a tow hook 223 type of first connecting end 102 and second connecting end 109. This type of connecting end is comprised of a threaded end 130, an eye 212 and tow hook 223. Tow hook 223 comes in a variety of sizes as measured from the end that connects to the eye, to the beginning of the curve of the hook. Typical sizes are 8" and 15" but any size may be used.

Figure 22:
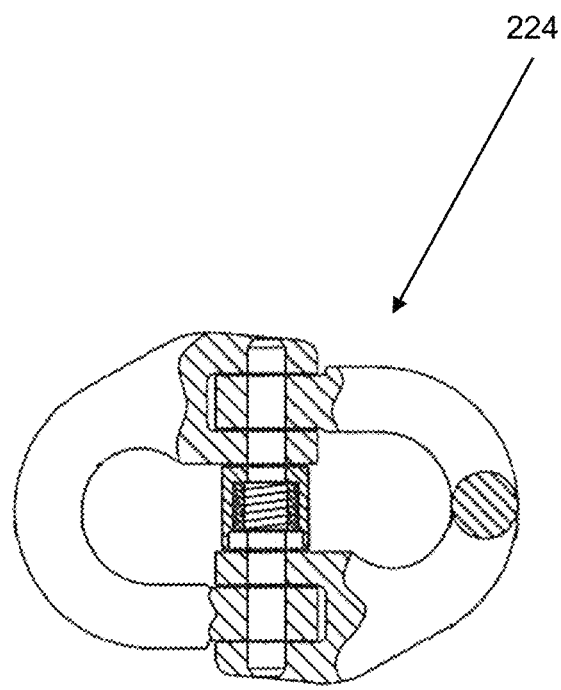
FIG. 22 is a connecting link connecting end.

FIG. 22 shows a connecting link 224. Connecting link 224 is often used to connect various connecting ends to a ratchet binder including chains, hooks, shock absorbers, loops, shackles, collared jaws and any other custom connecting ends disclosed herein or known in the art.

Figure 23:
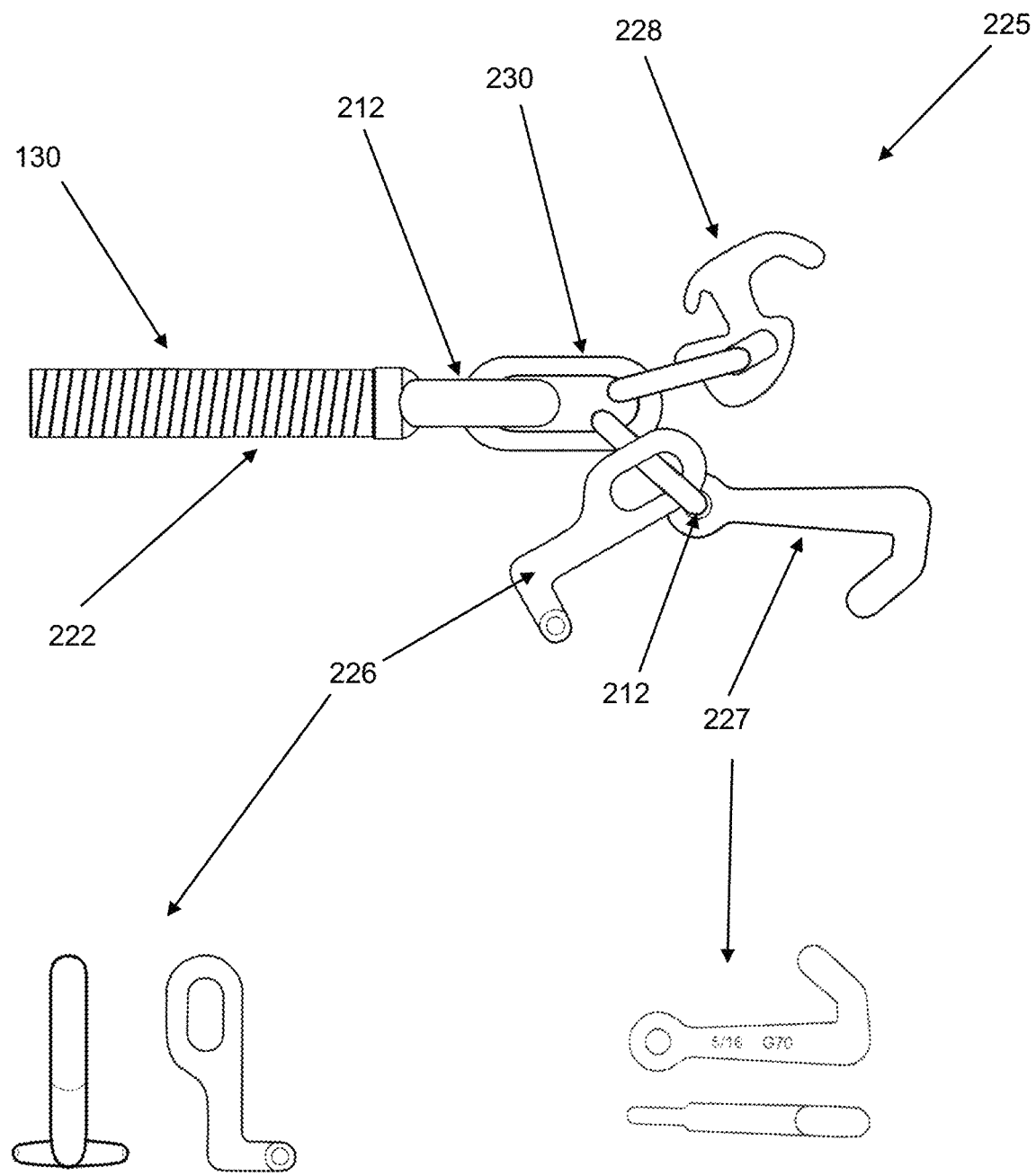
FIG. 23 is a tow hook cluster connecting end.

FIG. 23 shows tow hook cluster 225 type of first connecting end 102 and second connecting end 109. This type of connecting end is comprised of eye bolt 222, one or more welded links 230, R hook 228, J hook 227 and T hook 226. Eye bolt 222 is comprised of threaded end 130 and eye 212. J hook 227 also comprises an eye 212. R hook 228, J hook 227 and T hook 226 are connected to welded link 230 which is also threaded through eye 212 of threaded eye 222. This tow hook cluster 225 is a versatile connecting end that allows connections to a variety of other devices or ends, all in one connecting end. Further, R hook 228, J hook 227 and T hook 226 could be used as individual connecting ends or included in hook cluster 225.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A folding handle ratchet binder comprising:
   a first connecting end and a second connecting end, wherein the first connecting end is coupled to a first threaded connector having a threaded end opposite the first connecting end and the second connecting end is coupled to a second threaded connector having a threaded end opposite the second connecting end;
   a barrel with an exterior having a first threaded barrel end and a second threaded barrel end, wherein the first threaded barrel end has a thread pattern that couples to the threaded end of the first threaded connector and wherein the second threaded barrel end has a thread pattern that couples to the threaded end of the second threaded connector, the barrel further comprising a ratchet gear attached to the exterior of the barrel, wherein the ratchet gear comprises one or more raised gear teeth;
   a ratchet gear housing with an exterior that encloses the ratchet gear, the ratchet gear housing further comprising a handle, wherein the handle is foldable to be essentially parallel to the barrel in its folded position, an opening through the ratchet gear housing wherein a knob collar with a center opening is fitted in the opening and further a knob is fitted through the center opening of the knob collar and positioned on the exterior of the ratchet gear housing wherein the knob further comprises a base with a first pawl pin aperture;

a pawl with a shaft and a pawl head, wherein the pawl head has a first pawl head side that is shaped to engage with the one or more raised gear teeth of the ratchet gear and a second pawl head side that is shaped to allow the one or more raised gear teeth to pass the second pawl head, and wherein the shaft comprises a second pawl pin aperture;

a pawl attachment pin that is fitted through the first pawl pin aperture and the second pawl pin aperture to couple the knob and the pawl; and a pawl spring located around the shaft of the pawl wherein rotation of the knob results in rotation of the pawl to either engage or disengage the pawl head from the one or more gear teeth of the ratchet gear.

2. The folding handle ratchet binder of claim 1 wherein the first pawl head side is a notch with a right angle.

3. The folding handle ratchet binder of claim 1 wherein the second pawl head side is shaped essentially as the hypotenuse of a right triangle.

4. The folding handle ratchet binder of claim 1 wherein the base of the knob further comprises one or more tabs that couple with wells formed in the knob collar.

5. The folding handle ratchet binder of claim 1 wherein the first connecting end is selected from the group consisting of: one or more hooks, collared jaw with screw enclosure, cradle grab hook, slip hook, shock absorber with hook, shock absorber, flat grab hook, grab and slip hook combination, chain and hook combination, loop, anchor shackle, eye bolt, tow hook, chain, link, connecting link and tow hook cluster.

6. The folding handle ratchet binder of claim 1 wherein the second connecting end is selected from the group consisting of: one or more hooks, collared jaw with screw enclosure, cradle grab hook, slip hook, shock absorber with hook, shock absorber, flat grab hook, grab and slip hook combination, chain and hook combination, loop, anchor shackle, eye bolt, tow hook, chain, link, connecting link and tow hook cluster.

7. The folding handle ratchet binder of claim 1 where the knob further comprises a handle.

8. The folding handle ratchet binder of claim 1 where the knob further comprises a knob grip.

9. The folding handle ratchet binder of claim 1 where the ratchet gear housing further comprises a cap.

10. The folding handle ratchet binder of claim 1 where the folding handle ratchet binder is made from a material selected from the group of steel, stainless steel, bronze, aluminum and aluminum alloy.

* * * * *